US008650475B2

(12) United States Patent
Adepalli

(10) Patent No.: US 8,650,475 B2
(45) Date of Patent: Feb. 11, 2014

(54) SELECTIVE RESIZING OF DATA INPUT CELLS

(75) Inventor: Radhakrishna Adepalli, West Waterloo (CA)

(73) Assignee: BlackBerry Limited, Waterloo Ontario (CA)

( * ) Notice: Subject to any disclaimer, the term of this patent is extended or adjusted under 35 U.S.C. 154(b) by 165 days.

(21) Appl. No.: 13/005,911

(22) Filed: Jan. 13, 2011

(65) Prior Publication Data

US 2012/0185761 A1 Jul. 19, 2012

(51) Int. Cl.
*G06F 17/00* (2006.01)

(52) U.S. Cl.
USPC .......................................... 715/227; 715/269

(58) Field of Classification Search
USPC .................................. 715/227, 269
See application file for complete search history.

(56) References Cited

U.S. PATENT DOCUMENTS

| | | | | |
|---|---|---|---|---|
| 2003/0071850 | A1* | 4/2003 | Geidl | 345/781 |
| 2006/0078228 | A1* | 4/2006 | Tsutaki | 382/298 |
| 2008/0235578 | A1 | 9/2008 | Heed et al. | |
| 2011/0292084 | A1* | 12/2011 | Thomas | 345/661 |
| 2012/0092277 | A1* | 4/2012 | Momchilov | 345/173 |

FOREIGN PATENT DOCUMENTS

WO WO9410678 5/1994

OTHER PUBLICATIONS

European Search Report dated May 25, 2011 for European Application No. EP11150884.
Panorama; http://www.provue.com/Panorama/Features/index.html.
Panorama 6.0.0 Build 92277, Softpedia, http://mac.softpedia.com/get/Business/Panorma/shtml.
Diaz, Sam, "App guesses words to expand, shrink touch-screen keys for smarter typing", Mar. 24, 2010, http://blogs.zdnet.com/BTL/?p=32296.
Microsoft Tablet PC, "Using Tablet PC Input Panel", 2011 Microsoft Corporation; http://msdn.microsoft.com/en-us/library/ms818563(printer).aspx.
Excel Mobile; http://microsoft.com/windowsmobile/en-us/totalaccess/columns/excel-mobile-tips.mspx+excel+mobile+tips&cd=1&hl=en&ct=clnk&gl=ca.
MIT's Sketch-Interpreting Software; http://www.popsci.com/technology/article/2010-02/mits-sketch-interpreting-software-turns-tablet-computers-smart-whiteboards.
Spreadsheet Data Entry—iPad 1, Table PC Zip; http://gigaom.com/mobile/spreadsheet-data-entry-ipad-1-tablet-pc-zip/.

* cited by examiner

*Primary Examiner* — Nathan Hillery
(74) *Attorney, Agent, or Firm* — Jeffrey N. Giunta; Fleit Gibbons Gutman Bongini & Bianco PL

(57) ABSTRACT

A system and method to increase the size of a displayed data input cell in order to more effectively use a touch screen to enter data. A user selects an input cell to expand by a touching of or dragging an expansion icon. The user is then able to use that expanded area as a drawing area for handwritten input containing text, numbers, or sketches. After drawing in the expanded area, the user can select reducing the size of the input cell.

25 Claims, 4 Drawing Sheets

SELECTIVE RESIZING OF DATA INPUT CELLS

FIELD OF THE DISCLOSURE

The present disclosure generally relates to user interfaces for electronic devices and more particularly to user interfaces for receiving user input.

BACKGROUND

Electronic devices, such as computers and handheld devices, often present user interface displays into which users are able to enter information. Some user interface displays include cells or fields into which data can be entered. Examples include forms with input cells or displays of spreadsheet cells that can receive data provided by a user. Textual or numeric information is often entered into data input cells of a form by selecting a particular cell through the user interface facilities and typing information into the cell with a keyboard. These techniques for entering text or numeric data sometimes limits the usefulness of user interfaces presented on some portable electronic devices. Some portable electronic devices include a touch screen display that allows a user to input information by drawing on the display to input, for example, text, numbers, or even sketches of images. User input displays generally present data input cells with a size suitable to display characters entered with a keyboard. The size of cells on conventional user input displays can make writing directly into a data input cell using the touch screen display input capabilities difficult.

Therefore, using touch screen display input facilities is limited by the dimensions of displayed input forms.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
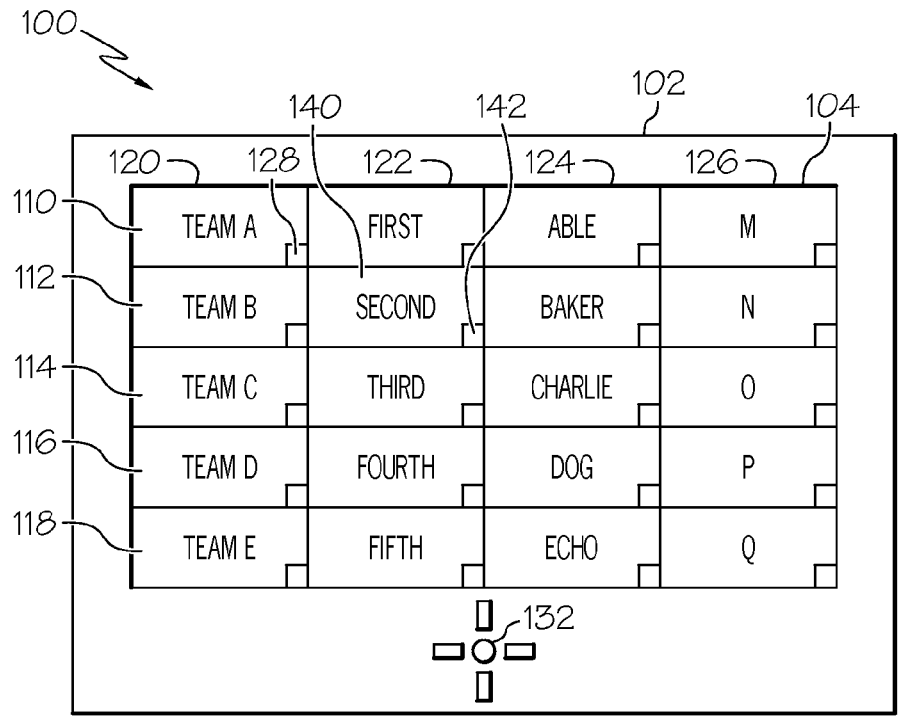
FIG. 1 illustrates a data input cell grid user interface in accordance with one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Described below are systems and methods that allow a user of an electronic device with a touch screen display input to increase the size of a displayed data input cell in order to more effectively use the touch screen to enter data into the expanded data input cell. The display of various examples present a multiple input cell presentation that consists of a number of displayed input cells. The user input facilities of a device allow a user to indicate which one input cell of the number of displayed input cells is to be a selected input cell that the user wishes to expand. The one selected input cell is able to be expanded to any size. The one selected input cell is able to be expanded to a size that is independent of data contained within the selected cell. In other words, expansion of the selected input cell is not limited to expansion to a size that allows the text or other content within the selected cell to be entirely visible, but is able to be expanded to display only a greater portion of the contents of the cell or over-expanded beyond a size required to show the entire contents of the selected input cell. The one selected input cell is also expanded to a size that is independent of the other displayed input cells.

Once the selected input cell is expanded, the touch screen display input mechanism is able to use the area of the expanded cell as a drawing area for handwritten input. The expanded area makes it easier for a user to enter handwritten text, numbers, or sketches. Further processing of the handwritten input is able to perform, for example, handwriting recognition to derive machine readable data such as character codes from the handwritten text input. Once the user has completed data entry, the user is then able to select that the selected input cell be reduced in size. The reduced size may correspond to a default input cell size or a size required to display the user provided input. Once the selected input cell is reduced in size, the user provided content is also able to be reduced in size to better fit the reduced size of the selected input cell.

FIG. 1 illustrates a data input cell grid user interface 100 in accordance with one example. The data input cell grid user interface 100 includes a touch screen display input 102. The touch screen display input 102 is an example of a display screen that presents a grid of a number of input cells 104. The grid of a number input cells 104 is an example of a multiple input cell presentation. The touch screen display input 102 of this example displays a rectangular grid of a number of input cells 104 that are able to receive data from a user. Each input cell 104 may be selected by touching the touch screen display input 102, e.g., with a stylus, finger or other touch enabling device, in an area associated with the corresponding input cell 104. The data input cell grid user interface 100 may also include a navigation key cluster 130 that includes keys to allow a user to move a cursor in an up, down, left, or right direction. The navigation key cluster 130 is an example of a user interface facility that receives input from a user, such as pressing of a key within the navigation key cluster 130, to identify a selected input cell from the number of displayed input cells. The navigation key cluster 130 includes a select key 132 that is used to, for example, select a data input cell once a cursor has been directed to that cell by the up, down left or right direction keys of the navigation key cluster 130. In an alternative example, the data input cell grid user interface 100 may include a display screen (not shown) without touch sensing capabilities used in combination with the navigation key cluster 130.

The illustrated touch screen display input 102 of this example displays a two dimensional grid of data input cells 104. Each input cell is able to display data associated with the input cell as well as receive data that is to be associated with that input cell from a user. As is further described below, a user is able to select an input cell and cause the input cell to be expanded to provide a greater area of the touch screen display input 102 to the user for drawing or handwritten input.

The illustrated two dimensional grid of data input cells 104 is a four column by five row grid. Various examples are able to display data input cells in any suitable arrangement based upon the needs of a particular application. The illustrated two dimensional grid of data input cells 104 has a first column 120, a second column 122, a third column 124 and a fourth column 126. The two dimensional grid of data input cells 104 has five rows: a first row 110, a second row 112, a third row 114, a fourth row 116, and a fifth row 118. Each input cell of the two dimensional grid of data input cells 104 is able to be selected either by a touching of the input cell on the touch screen display input 102 or by use of the navigation key cluster 130. Once an input cell is selected, data can be input into the selected input cell.

In the illustrated example, the two dimensional grid of data input cells 104 contains information concerning a number of teams. Data in the input cells of the first column 120 indicate the team name associated with each row. The second column 122 indicates an ordinal identifier for each team, such as "FIRST" for "TEAM A" of the first row 110. The third column 124 and the fourth column 126 each contain further information regarding that row's team. A second input cell 140 is illustrated at the intersection of the second row 112 and the second column 122. The second input cell 140 has a second cell expansion icon 142 that allows a user to expand the displayed area of the second input cell to facilitate entry of handwritten data using the touch screen display input 102, as is discussed in detail below.

Each input cell of the illustrated two dimensional grid of data input cells 104 has a respective resizing control. In the illustrated example, the input cells are all displayed with a normal size, i.e. an original size, and the displayed resizing control is an expansion graphical interface element in the form of an expansion icon. For example, the data input cell of the first row 110 and the first column 120, which contains the text "TEAM A," has a first expansion icon 128. The enlargement icons of the two dimensional grid of data input cells 104 are one example of resizing controls. As described in detail below, various examples of the data input cell grid user interface 100 allow the user to expand a particular data input cell by, for example, a touching of or moving an expansion icon that is associated with or part of the data input cell. A user is able to tap the expansion icon or drag the expansion icon of that input cell to cause the resizing control to receive the commands to resize the selected input cell. In the illustrated example, the selected input cell is the input cell that is associated with the expansion icon touched or moved by the user.

In further examples, a particular input cell is expanded automatically when the user provides an input to identify that particular input cell as the input cell. Additionally, a user of a touch screen display input 102 is able to use a touch screen gesture to indicate a command to resize the selected input cell. A touch screen gesture is made, for example, by moving one or more fingers in a determined manner across the touch screen display input 102. A number of touch screen gestures may be defined for a particular touch screen display input 102, such as to display another image, open another application and the like.

Figure 2:
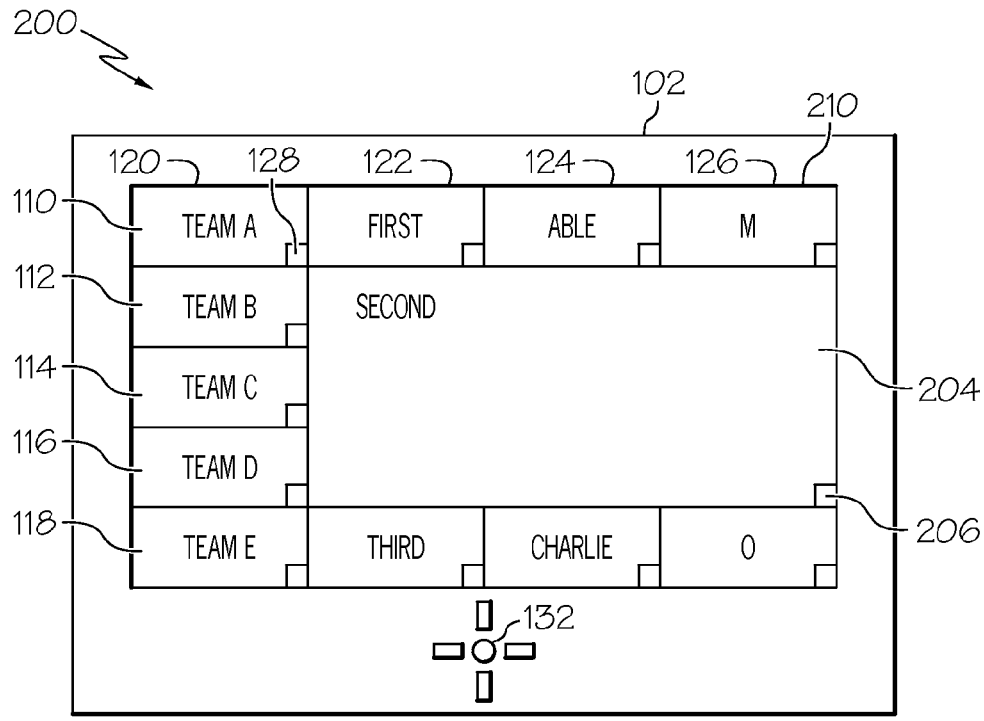
FIG. 2 illustrates an expanded data input cell grid user interface, in accordance with one example.

FIG. 2 illustrates an expanded data input cell grid user interface 200, in accordance with one example. The expanded data input cell grid user interface 200 illustrates an expanded cell display 210 that includes an expanded second input cell 204 of the two dimensional grid of data input cells described above with regards to the data input cell grid user interface 100. The expanded cell display 210 is an example of a multiple input cell presentation. As depicted for the expanded data input cell grid user interface 200, the expanded cell display 210 presents an unaltered display of the first row 110 and the first column 120 of input cells. The expanded data input cell grid user interface 200 depicts an expanded second input cell 204, which corresponds to the second input cell 140 of the data input cell grid user interface 100.

It is to be noted that the expanded second input cell 204 extends horizontally from the right side of the first column 120 to the right edge of the touch screen display input 102. The expanded second input cell 204 has been expanded vertically from a line corresponding to the bottom of the first row 110 to a line in the vicinity of the top of the fifth row 118. Below the expanded second input cell are displayed the second column 122, third column 124 and the fourth column 126 of the third row 114. Although the third row 114 is discontinuous since there is a vertical jump between the first column 120 and the second column 122 of the third row 114, one example expanded cell display 210 preserves the display of neighboring cells of the expanded second input cell 204 in this manner to provide the context of data in surrounding cells.

Various examples are able to select input cells to display around the expanded second input cell 204 according to various preferences or requirements of a particular user interface. In one example, selection of the input cell itself may cause the input cell to be expanded and the expanded cell may be restored to a normal size upon detection of a predetermined input, such as select key 132, an "Enter" key or any other designated input. In another example, a selected input cell may be expanded or an expanded cell may be restored to its original size through the use of touch screen gestures, e.g., swipe the screen upwards to expand, downwards to close, etc. In yet another example, an input cell is able to be expanded to use the entire area of the touch screen display input 102.

It is to be noted that the selected input cell of this example can be expanded to any size by using that input cell's expansion icon. Various embodiments are able to be configured to allow expansion of the selected input cell to any arbitrary size under the control of the user. Other examples allow expansion of the selected input cell to fixed expanded sizes. Some examples support both variable and fixed expansion sizes through the use of, for example, menu options, different icons, or similar techniques. It is also to be noted that the expanded second input cell 204 is expanded to a size that is independent of the data contained within that cell and is also expanded to a size that is independent of the other displayed input cells.

The user expands the second input cell 140 in one example by a touching of or tapping on the second cell expansion icon 142, which causes the second input cell 140 to expand to a size based on, for example, available area of the touch screen display input 102 and other data desired to be displayed thereon along with the expanded second input cell 204. In another example, a user is able move the second cell expansion icon 142 by placing a finger or stylus on it and dragging it down, to the right, or both down and to the right in order to expand the second input cell 140 by a desired amount to cause the second input cell 140 to be a new desired size. Other examples allow using cell expansion icons on non-touch screen displays by allowing the user to select the second cell expansion icon 142 without touching the display, such as by navigation key cluster 130 or a menu. Once the second cell expansion icon 142 is selected, the selecting alone may cause the second input cell 140 to expand or the user may be able to move the second cell expansion icon 142 by arrow keys or other similar user interface to cause a variable amount of expansion of the second input cell 140.

The expanded second input cell 204 allows a user to use its expanded area of the touch screen display input 102 for handwriting, drawing, or other input using the area of the touch screen display input 102 that is defined by the expanded second input cell 204. Users in various examples are able to draw in the area of the expanded second input cell 204 by placing and moving a finger tip or a stylus in that area, or by any other suitable input technique. In one example, once the second input cell 140 is expanded into the expanded second input cell 204, the contents of the second input cell are also expanded. In the illustrated expanded second input cell 204, the word contained in the second input cell 140, i.e., "SECOND," is expanded in the expanded second input cell 204 relative to the size of that displayed word in the second input cell 140. By expanding the displayed image of the data contained in the expanded second input cell 204, a user is better able to edit the contents of that input cell. In one example, graphical editing facilities are provided to the user to draw sketches into the expanded input cell and modify expanded representations of graphical images contained in the expanded input cell. In one example, the size or other characteristics of the data displayed in an expanded input cell are not changed from those displayed in the normal sized input cell.

The expanded second input cell 204 includes a second cell restore icon 206, which is an example of a restore graphical interface element. The second cell restore icon 206 is similar to the second cell expansion icon 142 and allows a user to quickly restore the size of the expanded second input cell 204 to its original size. In various examples, the second cell restore icon 206 is the same icon as the second cell expansion icon 142. In some examples, the same icon is able to be used to resize its associated input cell by either expanding or shrinking the input cell. A cell resize icon, which operates as either a cell expansion icon or a cell restore icon, can be used by a user placing his or her finger on the cell resize icon and dragging the cell resize icon to expand or shrink the associated input cell as desired. In various examples, different graphic images are displayed for the second cell expansion icon 142 and the second cell restore icon 206 to indicate to the user that the respective icon is used to expand or restore the size of its associated input cell. One example of the different graphical images include a second cell expansion icon 142 that depicts a generally upward pointing arrow and a second cell restore icon 206 that depicts a generally downward pointing arrow. In one example, similar icons are used for the cell expansion icons of all cells and similar cell restore icons are also used for all displayed input cells. Activation of a cell resize icon can similarly be performed by a touching of the icon that is presented on a touch screen display.

Figure 3:
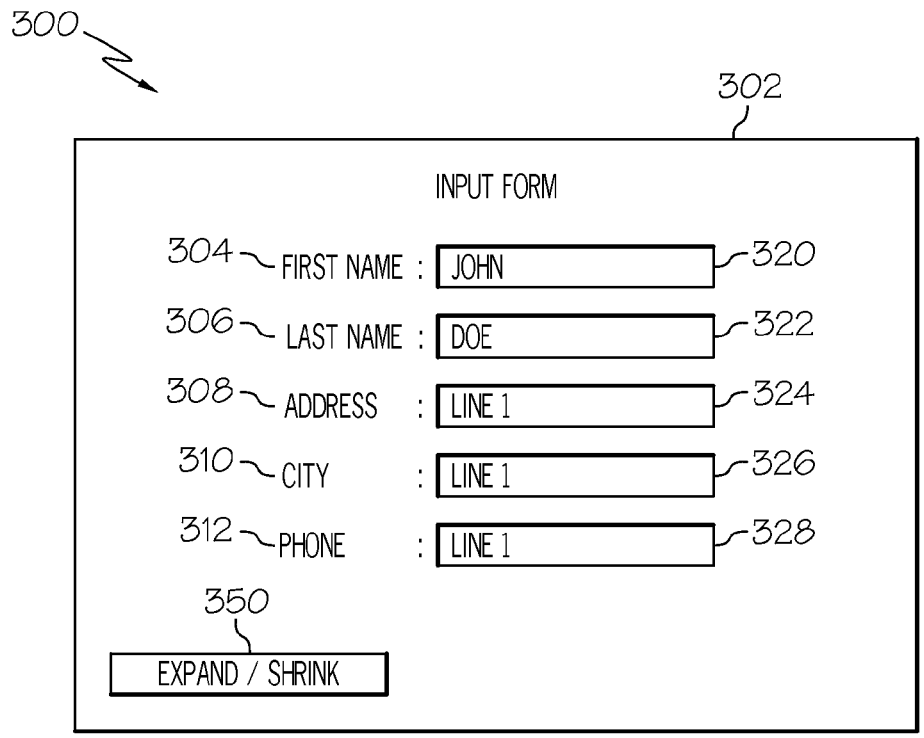
FIG. 3 is a user input form display according to one example.

FIG. 3 is a user input form display 300 according to one example. The user input form display 300 depicts an example of a data entry form 302 into which a user inserts information. The data entry form 302 is an example of a multiple input cell presentation that includes a separate row for five pieces of information that a user is to provide. A first row 304 includes a label "FIRST NAME" and has an associated first input cell 320. In the illustrated example, the first input cell 320 has the word "JOHN" entered therein. A second row 306 includes a label "LAST NAME" and has an associated second input cell 322 that has the word "DOE" entered therein. A third row 308 has a label "ADDRESS," a fourth row 310 has a label "CITY" and a fifth row 312 has a label "PHONE." The third row 308 has an associated third input cell 324, the fourth row 310 has an associated fourth input cell 326, and the fifth row 312 has an associated fifth input cell 328.

The data entry form 302 includes a single "expand/shrink" icon 350. The single "expand/shrink" icon 350 is another example of a resizing control that receives commands from a user to resize a selected input cell. In contrast to the respective cell expansion icons described above that are associated with each input cell, the data entry form 302 allows a user to select an input cell, such as by tapping on the cell or using navigation keys, and the user then taps or otherwise activates, such as by the select key 132 described above, a single user interface element that is the "expand/shrink" icon 350.

Figure 4:
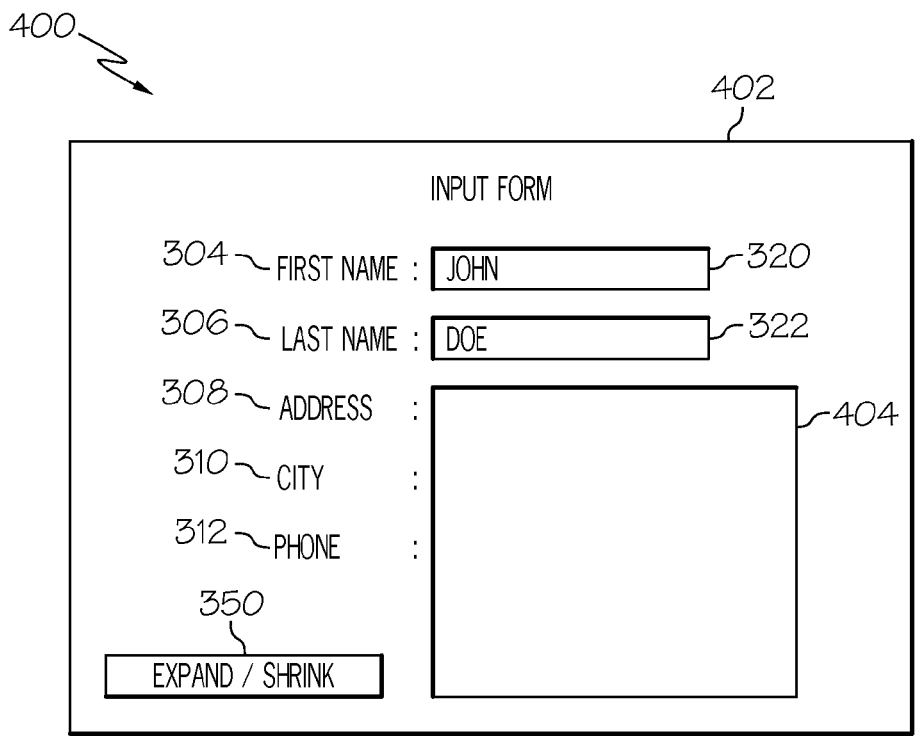
FIG. 4 illustrates an expanded cell user input form display in accordance with one example.

FIG. 4 illustrates an expanded cell user input form display 400 in accordance with one example. The expanded cell user input form display 400 includes an expanded cell data entry form 402 with an expanded third input cell 404. The expanded cell data entry form 402 is an example of a multiple input cell presentation. The expanded third input cell 404 corresponds to the third input cell 324 discussed above. A user is able to, for example, draw on the larger area of the expanded third input cell 404 to enter data, symbols, sketches, or combinations of those, as data into the third input cell 324. As described above, the third input cell 324 is part of the third row 308 which is labeled "ADDRESS." A user is able to, for example, handwrite a postal address into the expanded third input cell 404. In a further example, the expanded cell user input form display 400 is able to present graphical displays within the expanded third input cell 404 to assist the user in providing data. For example, a graphical street map of a city is able to be presented in the expanded third input cell 404 and a user is able to scroll thorough the map and point to a location that corresponds to the "address" that should be entered into the third input cell 324.

The expanded cell data entry form 402 has an expanded third input cell 404 that has an upper left corner located in the same location as the upper left corner of the third input cell 324. The expanded third input cell 404 is expanded such that its right side and bottom extend to near the right and bottom edge of the expanded cell data entry form 402. As shown, the expanded cell data entry form 402 does not modify the display of the first input cell 320, the second input cell, or any of the labels of the rows relative to their display in the user input form display 300. Preserving this information in the expanded cell user input form display 400 gives a user some context for supplying the information requested in the expanded input cell.

Once a user is finished completing entering information into the expanded third input cell 404, the user is able to activate the "expand/shrink" icon 350 to cause the expanded third input cell 404 to be resized to its normal size, and restore the user input form display 300. In a case of a touch screen display input, the user touches or taps the "expand/shrink" icon 350 to cause the expanded third input cell 404 to be resized.

The above discussion describes the expanded cell data entry form 402 as having a an expanded third input cell 404 that is resized to allow other portions of the expanded cell data entry form 402 to also be seen on the display. Further examples expand the selected input cell to other sizes. For example, the expanded third input cell 404 is able to be expanded to take the entire area of the touch screen display input. In an example where the expanded third input cell 404 is expanded to take the entire area of the touch screen display input, the "expand/shrink" icon 350 is depicted in a suitable manner to allow the user to complete data entry into the expanded cell. Further examples are also able to allow a user to resize expanded input cells, such as the expanded third input cell 404, once the "expand/shrink" icon 350 is pressed to cause the selected input cell to expand. Such resizing is able to be performed through special user interface elements such as additional menus, additional touch screen features, and the like.

Figure 5:
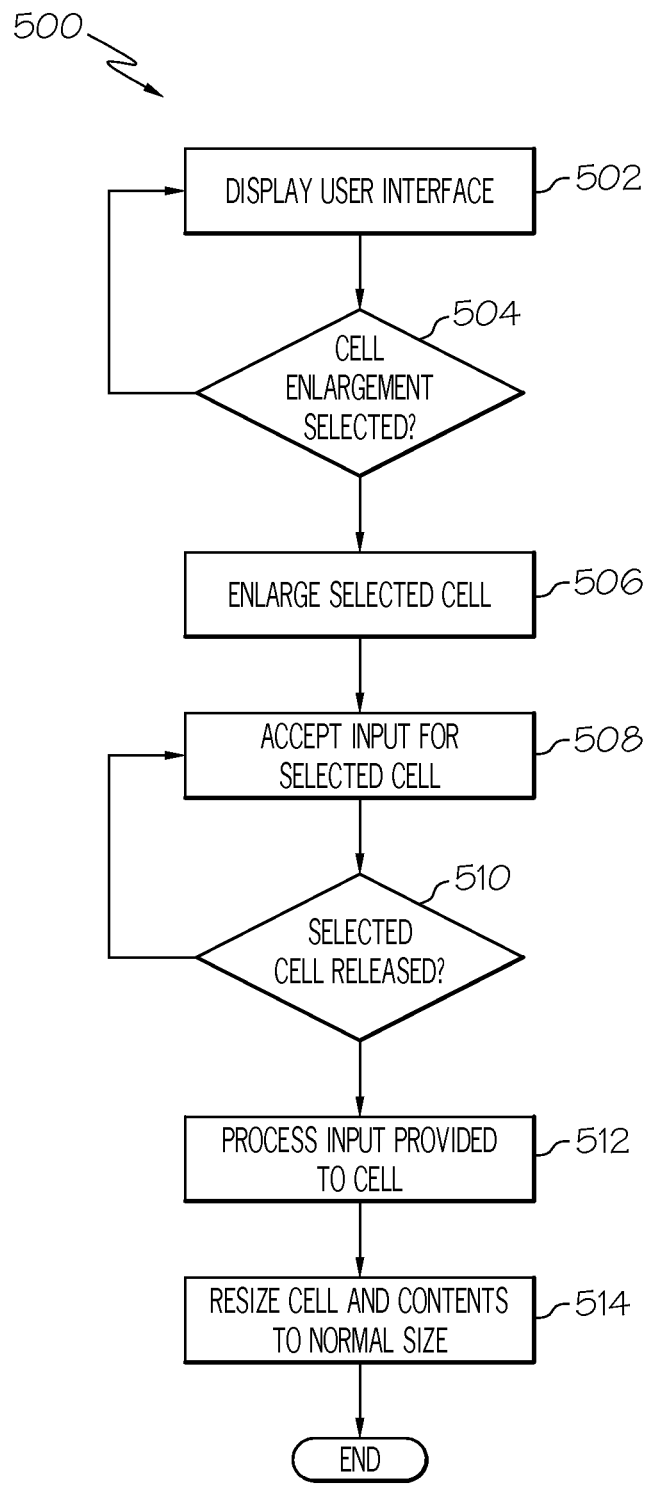
FIG. 5 illustrates an input cell resizing process, in accordance with one example.

FIG. 5 illustrates an input cell resizing process 500, in accordance with one example. The input cell resizing process 500 is performed by a processor driving a graphical user interface, such as the data input cell grid user interface 100, expanded data input cell grid user interface 200, user input form display 300, and expanded cell user input form display 400.

The input cell resizing process 500 begins by displaying, at 502, a user interface. In one example the user interface is a graphical user interface such as is described above for the data input cell grid user interface 100 and/or user input form display 300. The displaying is performed in one example by a touch screen input display that allows a user to touch icons on the display in order for the icon to receive a command represented by that icon. In one example, the process displays a multiple input cell presentation, such as are described above.

The input cell resizing process 500 continues to determine, at 504, if input cell expansion was selected for any input cell in the display. Input cell expansion is able to be selected by a resizing control associated with an input cell receiving a command to resize the cell. In one example, a resizing control receiving a command includes a user's selecting and activating a cell expansion icon associated with an input cell, such as the second cell expansion icon 142 described above. If input cell expansion was not selected, the processing returns to displaying, at 502, the user interface.

As described above, an icon or other graphical interface element that is associated with an input cell is able to be moved by a user to select expansion of an input cell. A user is also able to touch an icon or other graphical interface element to cause the input cell to be resized to a second size that is different than a first size. In one example, the first size is able to be a normal, or original, size. In further examples, a particular input cell is expanded automatically when the user provides an input to identify that particular input cell as the selected cell. Additionally, a user of a touch screen display input is able to use a touch screen gesture to indicate a command to resize the selected input cell. A touch screen gesture is made, for example, by moving one or more fingers in a determined manner across the touch screen display input.

If input cell expansion was selected, the processing continues by expanding, at 506, the selected input cell. The above described transition from the second input cell 140 to the expanded second input cell 204 in response to selecting the second cell expansion icon 142 is an example of expanding the selected input cell. The selected input cell is able to be indicated by being associated with an activated cell expansion icon or by other suitable selection methods.

The processing continues by accepting, at 508, input for the selected input cell. As discussed above, a user may provide input to be accepted by the processing by handwriting input such as handwritten text, handwritten images, or combinations of handwritten text and handwritten images into the expanded input cell. The processing receives this handwritten input that is written within the selected input cell when the selected input cell is expanded.

The processing continues by determining, at 510, if the selected input cell is released. A selected input cell is released when, for example, a user is finished with providing input into the input cell or if the user indicates that the input cell should be returned to its normal, or original, size. An input cell is able to be released by selecting and activating, for example, a cell restore icon, such as the second cell restore icon 206. An input cell is also able to be released by a user performing touch screen gesture. Other suitable techniques are able to indicate that the input cell is released. If the selected input cell is not released, the processing returns to accepting, at 508, input for the selected input cell.

When it is determined that the selected input cell is released, the received input that was provided to the selected input cell is processed, at 512, to produce derived content that is, for example, able to be better represented on an electronic display. Inputs provided to the input cell are able to include, for example, handwritten input including handwritten text or handwritten sketches. One example processes these handwritten inputs to derive, for example, machine codes such as are defined by the American Standard Code for Information Interchange (ASCII) for codes that correspond to alphanumeric characters contained in the handwritten text. Handwritten text is also able to be processed to derive clean, well formed textual images representing the alphanumeric characters contained in the handwritten text. Clean, well formed characters include, for example smoothed representations of the handwritten text or stored representations of alphanumeric characters representing the characters identified within the handwritten text. Such clean, well formed characters are able to also be determined in combination with machine codes for those characters. Such processing is able to be based upon, for example, Optical Character Recognition (OCR) processing to recognize handwritten characters and convert them into a clean representation or character codes. The processing of one example further processes handwritten inputs to identify and refine hand drawn sketches, which may or may not correspond to alphanumeric characters but may also include graphical content or any type of artwork, into clean, well formed images that are able to be better presented on a computer display. Input provided to the input cell is also able to be at least reduced in size to better fit the restored input cell size once the input cell is returned to its normal, or original, size. The processing continues to resize, at 514, the input cell and its contents to the normal, pre-expanded, size. The processing then ends.

Figure 6:
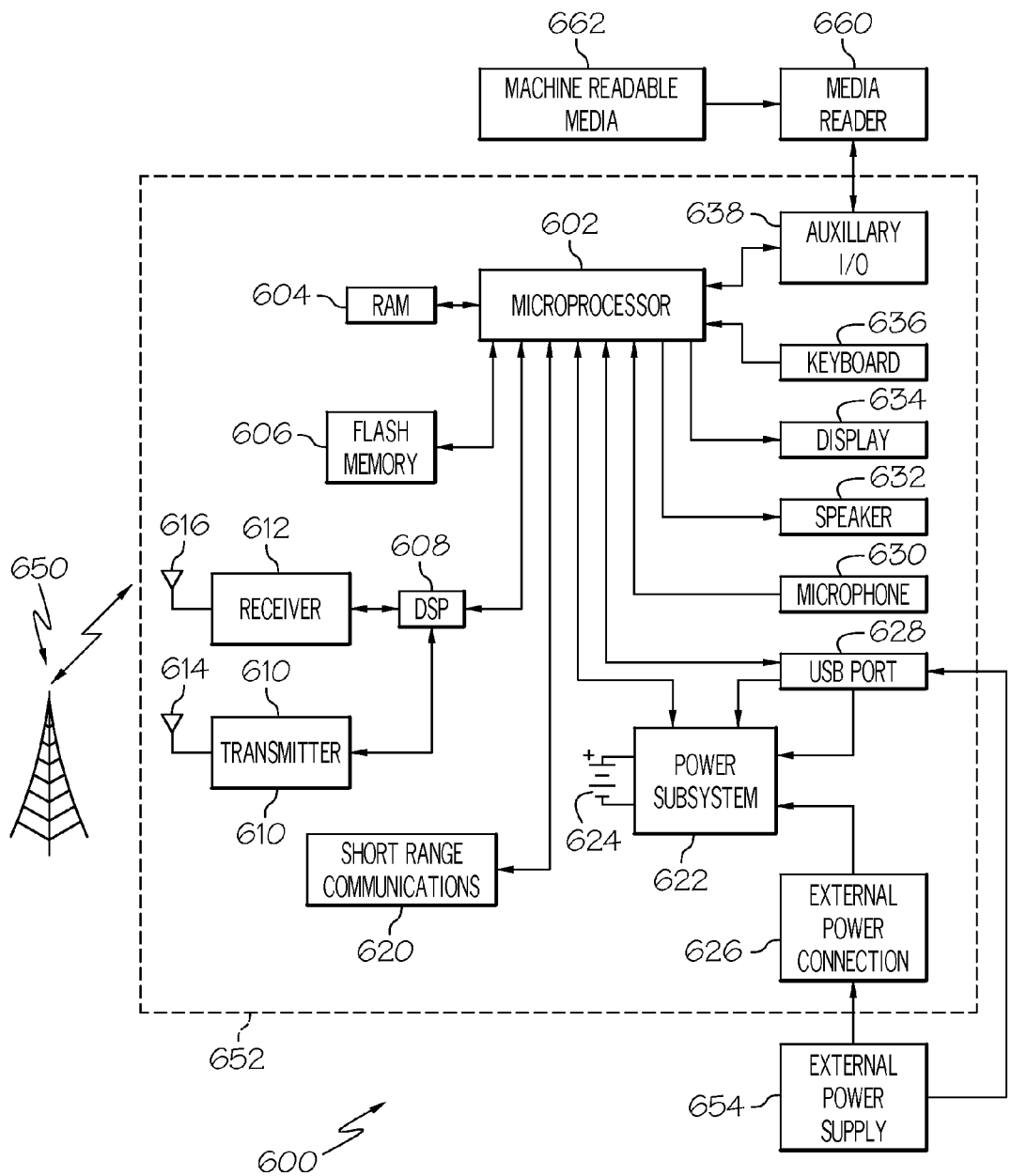
FIG. 6 is a block diagram of an electronic device and associated components in which the systems and methods disclosed herein may be implemented.

FIG. 6 is a block diagram of an electronic device and associated components 600 in which the systems and methods disclosed herein may be implemented. In this example, an electronic device 652 is a wireless two-way communication device with voice and data communication capabilities. Such electronic devices communicate with a wireless voice or data network 650 using a suitable wireless communications protocol. Wireless voice communications are performed using either an analog or digital wireless communication channel. Data communications allow the electronic device 652 to communicate with other computer systems via the Internet. Examples of electronic devices that are able to incorporate the above described systems and methods include, for example, a data messaging device, a two-way pager, a cellular telephone with data messaging capabilities, a wireless Internet appliance, a tablet computing device, or a data communication device that may or may not include telephony capabilities.

The illustrated electronic device 652 is an example electronic device that includes two-way wireless communications functions. Such electronic devices incorporate communication subsystem elements such as a wireless transmitter 610, a wireless receiver 612, and associated components such as one or more antenna elements 614 and 616. A digital signal processor (DSP) 608 performs processing to extract data from received wireless signals and to generate signals to be transmitted. The particular design of the communication subsystem is dependent upon the communication network and associated wireless communications protocols with which the device is intended to operate.

The electronic device 652 includes a microprocessor 602 that controls the overall operation of the electronic device 652. The microprocessor 602 interacts with the above described communications subsystem elements and also interacts with other device subsystems such as flash memory 606, random access memory (RAM) 604. The flash memory 606 and RAM 604 in one example contain program memory and data memory, respectively. The microprocessor 602 also interacts with an auxiliary input/output (I/O) device 638, a Universal Serial Bus (USB) Port 628, a display 634, a keyboard 636, a speaker 632, a microphone 630, a short-range communications subsystem 620, a power subsystem 622, and any other device subsystems.

In one example, the microprocessor 602 includes a display controller that is configured to resize the display of selected input cells, as is described above. The keyboard 636 is further able to include a navigation key cluster 130 as described above. The display 634 in one example is a touch screen display input 102, as described above. The keyboard 636 may be a physical ("hard") keyboard or a virtual ("soft") keyboard implemented, for example, as key images displayed on the touch screen display input 102.

A battery 624 is connected to a power subsystem 622 to provide power to the circuits of the electronic device 652. The power subsystem 622 includes power distribution circuitry for providing power to the electronic device 652 and also contains battery charging circuitry to manage recharging the battery 624. The power subsystem 622 includes a battery monitoring circuit that is operable to provide a status of one or more battery status indicators, such as remaining capacity, temperature, voltage, electrical current consumption, and the like, to various components of the electronic device 652.

The USB port 628 further provides data communication between the electronic device 652 and one or more external devices. Data communication through USB port 628 enables a user to set preferences through the external device or through a software application and extends the capabilities of the device by enabling information or software exchange through direct connections between the electronic device 652 and external data sources rather than via a wireless data communication network.

Operating system software used by the microprocessor 602 is stored in flash memory 606. Further examples are able to use a battery backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604. As an example, a computer executable program configured to perform the input cell resizing process 500, described above, is included in a software module stored in flash memory 606.

The microprocessor 602, in addition to its operating system functions, is able to execute software applications on the electronic device 652. A predetermined set of applications that control basic device operations, including at least data and voice communication applications, is able to be installed on the electronic device 652 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the electronic device 652 through, for example, the wireless network 650, an auxiliary I/O device 638, USB port 628, short-range communications subsystem 620, or any combination of these interfaces. Such applications are then able to be installed by a user in the RAM 604 or a non-volatile store for execution by the microprocessor 602.

In a data communication mode, a received signal such as a text message or web page download is processed by the communication subsystem, including wireless receiver 612 and wireless transmitter 610, and communicated data is provided the microprocessor 602, which is able to further process the received data for output to the display 634, or alternatively, to an auxiliary I/O device 638 or the USB port 628. A user of the electronic device 652 may also compose data items, such as e-mail or instant messages, using the keyboard 636, which is able to include a complete alphanumeric keyboard or a telephone-type keypad, in conjunction with the display 634 and possibly an auxiliary I/O device 638. Such composed items are then able to be transmitted over a communication network through the communication subsystem.

For voice communications, overall operation of the electronic device 652 is substantially similar, except that received signals are generally provided to a speaker 632 and signals for transmission are generally produced by a microphone 630. Alternative voice or audio I/O subsystems, such as a voice message recording subsystem, may also be implemented on the electronic device 652. Although voice or audio signal output is generally accomplished primarily through the speaker 632, the display 634 may also be used to provide an indication of the identity of a calling party, the duration of a voice call, or other voice call related information, for example.

Depending on conditions or statuses of the electronic device 652, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 620 is a further optional component which may provide for communication between the electronic device 652 and different systems or devices, which need not necessarily be similar devices. For example, the short-range communications subsystem 620 may include an infrared device and associated circuits and components or a Radio Frequency based communication module such as one supporting Bluetooth® communications, to provide for communication with similarly-enabled systems and devices.

A media reader 660 is able to be connected to an auxiliary I/O device 638 to allow, for example, loading computer readable program code of a computer program product into the electronic device 652 for storage into flash memory 606. In one example, computer readable program code includes instructions for performing the input cell resizing process 500, described above. One example of a media reader 660 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 660 is alternatively able to be connected to the electronic device through the USB port 628 or computer readable program code is alternatively able to be provided to the electronic device 652 through the wireless network 650.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A display for presenting a multiple input cell presentation, the display comprising:
    a display screen configured to present a plurality of input cells, each respective input cell of the plurality of input cells receiving data at a time that the data is input by a user into the respective input cell;
    at least one resizing control configured to receive a command to resize a display of one selected input cell within the plurality of input cells, the one selected input cell being defined by a plurality of edges, each edge within the plurality of edges separating the one selected input cell from a respective adjacent input cell within the plurality of input cells; and
    a display controller, communicatively coupled to the at least one resizing control and the display screen, configured to:
    display the plurality of input cells in an initial configuration; and
    expand by moving a presentation of at least one edge within the plurality of edges of the selected input cell from an initial position to a different position, in response to the at least one resizing control receiving the command, the one selected input cell from a first size to a second size displayed on the display screen,
        the selected input cell being configured, when the selected input cell is displayed at the second size, to receive data from a user at the time that the data is input by the user,
        the second size being independent of other input cells within the plurality of input cells, and the one selected input cell, when expanded to the second size, occupying a space occupied by the one selected input cell in the initial configuration and further displacing at least one other input cell within the plurality of input cells that is adjacent to the one selected input cell in the initial configuration, the at least one other input cell being different than the selected input cell.

2. The display of claim 1, the resizing control comprising a graphical interface element presented on the display screen and movable to specify the second size.

3. The display of claim 1, the display comprising a touch screen display input configured to interpret touch screen gestures, the command to resize the display of one selected input cell comprising a touch screen gesture performed by dragging an edge of the selected input cell to a location corresponding to the second size.

4. The display of claim 1, the display comprising a touch screen display input configured to interpret touch screen gestures, the touch screen gestures comprising a command to restore the display of one selected input cell to the first size,
    wherein the display controller is further configured to resize, in response to receiving the command to restore the display of the one selected input cell to the first size, the one selected input cell from the second size to the first size displayed on the display screen.

5. The display of claim 1, the resizing control further configured to receive an input to identify the one selected input cell from within the plurality of input cells, wherein the input to identify the selected input cell is the command to resize the display of the one selected input cell.

6. The display of claim 1, further comprising user interface facilities configured to receive an indication of an end of input into the selected cell,
    wherein the display controller is further configured to resize, in response to the indication of the end of input into the selected cell, the one selected input cell from the second size to the first size displayed on the display screen.

7. The display of claim 1, the display further comprising a touch screen display input configured to receive handwritten input within the selected input cell when the selected input cell is displayed in the second size, and the display controller further configured to create a derived content representing the handwritten input within the selected cell.

8. The display of claim 7, the display controller further configured to create the derived content based upon character recognition processing of characters contained within the handwritten input, the derived content being at least one of machine codes and well formed textual images.

9. The display of claim 1, the at least one resizing control comprising a respective graphical user interface element attached to each input cell of the plurality of input cells, the selected input cell being an input cell associated with a respective graphical user interface element receiving the command.

10. The display of claim 9, the respective graphical user interface element comprising at least an expansion graphical interface element and a restore graphical interface element, the expansion graphical interface element being displayed when the selected input cell is displayed at the first size and the restore graphical interface element being displayed when the selected input cell is displayed at the second size.

11. The display of claim 10, the display comprising a touch screen display input, the expansion graphical interface element receiving the command to resize the selected input cell to the second size by a touching of the expansion graphical interface element on the touch screen display input, and the restore graphical interface element receiving the command to resize the selected input cell to the first size by a touching of the restore graphical interface element on the touch screen display input.

12. The display of claim 10, the display comprising a touch screen display input, the expansion graphical interface element being movable by dragging across the touch screen display input, the expansion graphical interface element receiving the command by being dragged to a location corresponding to at least one edge of the second size, and the restore graphical interface element receiving a command to resize the selected input cell to the first size by a touching of the restore graphical interface element on the touch screen display input.

13. The display of claim 1, wherein the display controller is further configured to:

display, in response to moving the presentation of the at least one edge, at locations adjacent to the one selected input cell, when the one selected input cell is expanded to the second size, the at least one other input cell that is adjacent to the one selected input cell.

14. A method for presenting a multiple input cell presentation, the method comprising:

presenting, on a display screen, a plurality of input cells, each respective input cell of the plurality of input cells receiving data at a time that the data is input by a user into the respective input cell;

receiving a command to resize a display of one selected input cell within the plurality of input cells, the one selected input cell being defined by a plurality of edges, each edge within the plurality of edges separating the one selected input cell from a respective adjacent input cell within the plurality of input cells;

displaying the plurality of input cells in an initial configuration; and expanding by moving a presentation of at least one edge within the plurality of edges of the selected input cell from an initial position to a different position, in response to receiving the command, the one selected input cell from a first size to a second size displayed on the display screen, the selected input cell being configured, when the selected input cell is displayed at the second size, to receive data from a user at the time that the data is input by the user, the second size being independent of other input cells within the plurality of input cells, and the one selected input cell, when expanded to the second size, occupying a space occupied by the one selected input cell in the initial configuration and further displacing at least one other input cell within the plurality of input cells that is adjacent to the one selected input cell in the initial configuration, the at least one other input cell being different than the selected input cell.

15. The method of claim 14, further comprising displaying a resizing control comprising a graphical interface element presented on the display screen and movable to specify the second size.

16. The method of claim 14, the receiving the command comprising receiving, by a single user interface element, input from a user to identify the selected input cell from within the plurality of input cells.

17. The method of claim 14, the receiving the command comprising receiving, by one of a respective graphical user interface element attached to each input cell of the plurality of input cells, the command, and the selected input cell being an input cell associated with the one of the respective graphical user interface element receiving the command.

18. The method of claim 17, the receiving the command comprising receiving the command through at least an expansion graphical interface element and a restore graphical interface element, the expansion graphical interface element being displayed when the selected input cell is displayed at the first size and the restore graphical interface element being displayed when the selected input cell is displayed at the second size.

19. The method of claim 18, the receiving the command comprising receiving the command through display comprising a touch screen display input, the expansion graphical interface element receiving the command to resize the selected input cell to the second size by a touching of the expansion graphical interface element on the touch screen display input, and the restore graphical interface element receiving the command to resize the selected input cell to the first size by a touching of the restore graphical interface element on the touch screen display input.

20. The method of claim 19, the receiving the command comprising receiving the command through display comprising a touch screen display input, the expansion graphical interface element being movable by dragging across the touch screen display input to a location corresponding to at least on edge of the second size, the expansion graphical interface element receiving the command by being moved to specify the second size, and the restore graphical interface element receiving a command to resize the selected input cell to the first size when by a touching of the restore graphical interface element on the touch screen display input.

21. A computer program product for presenting a multiple input cell presentation, the computer program product comprising:

a computer readable storage medium having computer readable program code embodied therewith, the computer readable program code comprising instructions for:

presenting, on a display screen, a display of a plurality of input cells, each respective input cell of the plurality of input cells receiving data at a time that the data is input by a user into the respective input cell;

receiving a command to resize a display of one selected input cell within the plurality of input cells, the one selected input cell being defined by a plurality of edges, each edge within the plurality of edges separating the one selected input cell from a respective adjacent input cell within the plurality of input cells;

displaying the plurality of input cells in an initial configuration; and expanding by moving a presentation of at least one edge within the plurality of edges of the selected input cell from an initial position to a different position, in response to receiving the command, the display of the one selected input cell from a first size to a second size displayed on the display screen, the selected input cell being configured, when the selected input cell is displayed at the second size, to receive data from a user at the time that the data is input by the user, the second size being independent of other input cells within the plurality of input cells, and the one selected input cell, when expanded to the second size, occupying a space occupied by the one selected input cell in the initial configuration and further displacing at least one other input cell within the plurality of input cells that is adjacent to the one selected input cell in the initial configuration, the at least one other input cell being different than the selected input cell.

22. The computer program product of claim 21, further comprising displaying a resizing control comprising a graphical interface element presented on the display screen and movable to specify the second size.

23. The computer program product of claim 21, the receiving the command comprising receiving, by one of a respective graphical user interface element attached to each input cell of the plurality of input cells, the command, and the selected input cell being an input cell associated with the one of the respective graphical user interface element receiving the command.

24. A portable electronic device for presenting a multiple input cell presentation, the portable electronic device comprising:

a processor;

a memory, communicatively coupled to the processor, configured to store information operated upon by the processor;

a display screen configured to present a display of a plurality of input cells, each respective input cell of the plurality of input cells configured to receive data at a time that the data is input by a user into the respective input cell;

at least one resizing control configured to receive a command to resize a display of one selected input cell within the plurality of input cells, the one selected input cell being defined by a plurality of edges, each edge within the plurality of edges separating the one selected input cell from a respective adjacent input cell within the plurality of input cells; and a display controller, communicatively coupled to the at least one resizing control and the display screen, configured to:

display the plurality of input cells in an initial configuration; and expand by moving a presentation of at least one edge within the plurality of edges of the selected input cell from an initial position to a different position, in response to the at least one resizing control receiving the command, the display of the one selected input cell from a first size to a second size displayed on the display screen, the selected input cell being configured, when the selected input cell is displayed at the second size, to receive data from a user at the time that the data is input by the user, the second size being independent of other input cells within the plurality of input cells, and the one selected input cell, when expanded to the second size, occupying a space occupied by the one selected input cell in the initial configuration and further displacing at least one other input cell within the plurality of input cells that is adjacent to the one selected input cell in the initial configuration, the at least one other input cell being different than the selected input cell, and the processor accepting data entered into the selected input cell while the selected input cell is resized to the second size.

25. The portable electronic device of claim 24, further comprising:

a wireless communications component configured to provide wireless data communications between the processor and a wireless data network.

* * * * *